Aug. 27, 1968  J. A. GITHENS ET AL  3,399,404
TARGET DETECTOR FOR ACQUISITION RADAR
Filed Feb. 23, 1966  2 Sheets-Sheet 1

John A. Githens
John G. Tryon,
INVENTORS.

John A. Githens
John G. Tryon,
INVENTORS.

United States Patent Office 3,399,404
Patented Aug. 27, 1968

3,399,404
TARGET DETECTOR FOR ACQUISITION RADAR
John A. Githens, Morris Township, Morris County, N.J., and John G. Tryon, Fairbanks, Alaska, assignors, by mesne assignments, to the United States of America as represented by the Secretary of the Army
Filed Feb. 23 1966, Ser. No. 531,011
8 Claims. (Cl. 343—5)

ABSTRACT OF THE DISCLOSURE

A target detector for an acquisition radar system wherein target data arriving at a high peak rate is received and stored. The stored data is released at a reduced sequential rate to a common processing unit. The target detector includes a receiving means which receives the target data, a buffer which stores the data temporarily, a control for the buffer which determines the sequential release of data, and a calculator for comparing the data and determining the presence or absence of a target.

---

Figure 1:
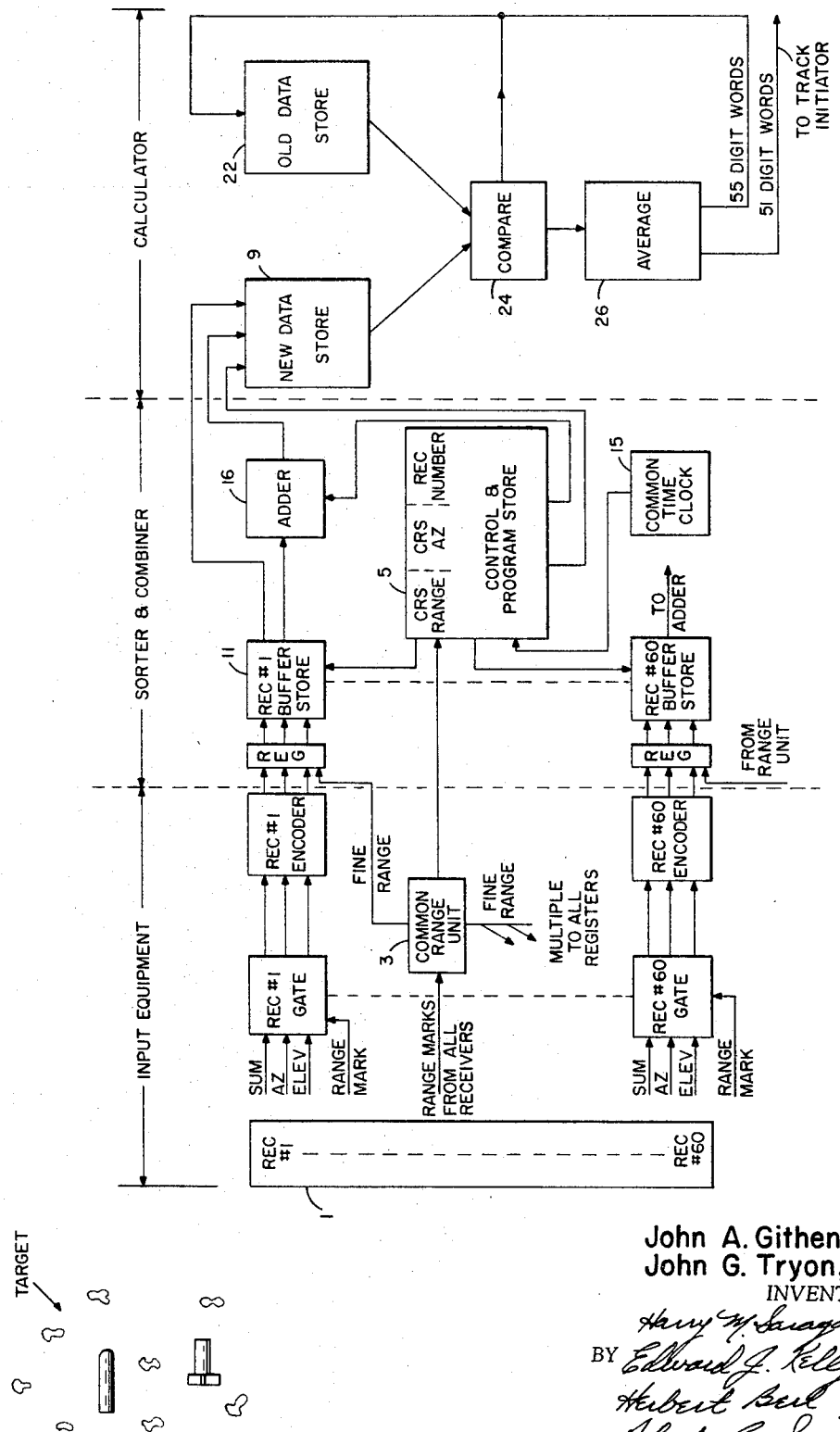

This invention relates generally to a target detector for the Nike-Zeus acquisition radar system. Specifically the present invention relates to a target detector system wherein target data arriving at a high peak rate is temporarily stored in individual receiver buffer stores from which it is sequentially released at a reduced rate to a common processing unit.

A target detector of the Nike-Zeus acquisition radar must monitor the outputs of the numerous (180) receivers of the antenna system. In doing so, it must perform the following functions: Provide three dimensional digital target position information from the receiver analog video signals; determine if a signal is in fact a target or a noise pulse; average the individual target positions obtained from a given target during a "look" period; and determine the quality of data, i.e., the number of targets. In obtaining target position information, it must combine the antenna positional information with the monopulse interpolation signals which determine the target position within an antenna beamwidth. Because the target detector must process the outputs of 180 receivers each of which is capable of reporting targets at a peak rate of one target per 4μs., it is extremely important that the most efficient use be made of circuitry to perform this task accurately and reliably.

It is, therefore, an object of the present invention to provide a target detector which will process the receiver outputs of an acquisition radar.

A further object of the invention is to provide a target detector system which will report the average target positions as an antenna scans by the target.

A still further object of the present invention is a system to determine if a radar return is a target or a noise pulse.

The present invention solves the problems presented in a target detector for an acquisition radar system by a digital system which utilizes a common processor for the radar receivers of an antenna yoke. Target data arriving at a high peak rate is temporarily stored in individual receiver buffer stores from which it is sequentially released at a reduced rate to a common processing unit. Our target detector takes advantage of the fact that the expected peak data rate is far below the theoretical peak data rate and the average data rate is even considerably lower. Storge space is provided for the maximum expected peak target densities, and a common processing unit is provided for each of the three antenna yokes of the radar system. The analog receiver data is converted to digital information at the receiver output and, thereafter, is processed in digital form.

Figure 2:
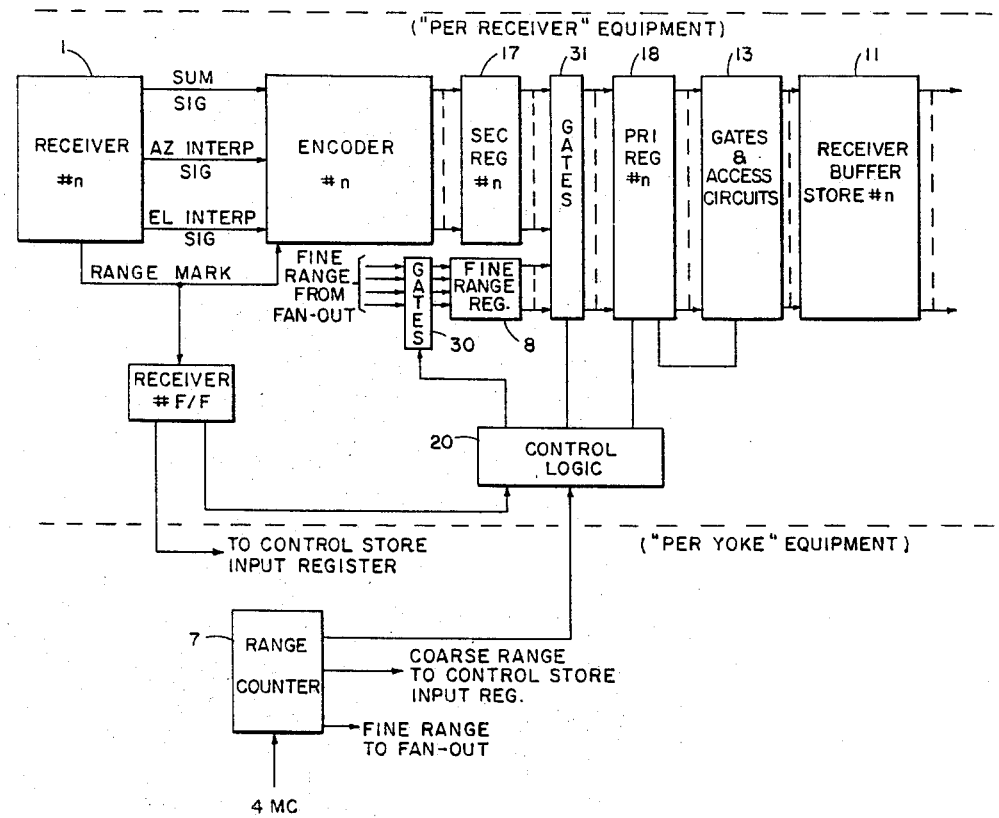

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

FIGURE 1 is a functional block diagram illustrating a preferred form of the present invention, and FIGURE 2 illustrates in greater detail the connections of the input equipment and the sorter and combiner of FIGURE 1.

In the Nike-Zeus radar system, initial contact with approaching targets is made by the acquisition radar. It continually revolves in azimuth and automatically scans in elevation illuminating all objects above the horizon out to very long range. The receivers of the acquisition radar get their signals from a symmetrical three antenna (three yokes) radar which rotates once every 15 seconds so that all 360° are scanned once every 5 seconds. The target detector of this invention is duplicated for each yoke so that the loss of one detector will still allow the radar system to function at a reduced rate.

The target detectors monitor the outputs of the numerous receivers associated with the radar and report the average target positions associated with the number of pulses returned from each target as the antenna scans by it. It will distinguish targets from noise. In obtaining target position information the target detectors must combine the antenna positional information with the monopulse interpolation signals to determine the target position within an antenna beamwidth.

In order to better understand the operation of the system described in the figures, a description of their components referred to is first presented. Each target detector can be separated into three main functional areas. As shown in FIGURE 1, these are input equipment, sorter and combiner, and calculator.

Input equipment

The input equipment converts the received analog radar data to digital form. Referring to FIGURE 1, the input equipment consists primarily of 60 receivers 1, receiver gates 1–60, 60 receiver encoders, and a range unit 3. The individual receivers provide two kinds of data: antenna position data determined by which antenna cluster receives target information while the antenna scans in azimuth and monopulse interpolation data which specifies the target position within the beam of the particular antenna cluster which receives the target return. This data is contained in four input analog voltages representing a sum signal, an azimuth interpolation signal, an elevation interpolation signal, and a range mark. The range mark is used to mark receiver yoke azimuth, target range, and receiver number for storage in the control and program store unit 5 by way of the range unit. The other three analog voltages from the receivers are gated into their encoder which converts them into binary words.

The azimuth and elevation interpolation signals are encoded by the encoders 1–60 to 7 binary digits each. The sum signal, which provides a measure of the amplitude of the returned pulse, is encoded to 4 binary digits.

A digital range unit 3 is provided for each yoke of the system. The range counter 7 of range unit 3 is set to zero each sweep at the time that the main-bang from a transmitter arrives at receiver outputs. The counter is driven by a four megacycle clock, so a single count corresponds to 41 yards of range. Using a four megacycle clock allows the four least significant digits to reach full count in four microseconds and result in a quantizing error of only 41% of the desired range accuracy. A four digit fine range register 8 is associated with each receiver. This allows the four least significant digits (fine range) to be handled separately from the 11 most significant digits (coarse range) without need for an addition process to combine the coarse and fine information for obtaining total range. The least significant coarse range digit changes once each four microseconds. Each new coarse range code is entered into the control and program store unit 5 to be written into its register if one or more range marks arrive during the corresponding four microsecond interval. The fine range registers of the range unit are all at zero at the transition between four-microsecond intervals and the count is gated to them at the four megacycle rate at all other times unless gating is stopped by a range mark. The register reading at the time gating is stopped defines the position of a target within the range slot and the coarse range count at the beginning of the 4 μs. interval defines the range slot. When coarse and fine range counts are recombined by putting the digits together in order of their proper significance a range word with 41 yard range granularity results without the need of an addition process. The coarse and fine range counts are combined at the new data store input register 9.

Sorter and combiner

The sorter and combiner, FIGURES 1 and 2, acts as a buffer which accepts data at the peak rate and slows down the flow of signal data to the calculator so that it may be processed by a single calculator. The individual receiver buffers 11 receive the position interpolation data and store it in the sequence in which it arrives. At the time the data is gated into the buffer stores by gates 13, storage of this data is marked in control store 5. The control store is a buffer store similar in its action to the receiver buffer stores. It stores the coarse range information and antenna position information and controls the ordered readout of data from the receiver buffers. The control store is arranged as follows: Coarse range 11 bits, azimuth position 14 bits, and receiver number 60 bits. Upon receipt of a target, its interpolated data is stored in the associated receiver buffer store 11. Simultaneously, the corresponding coarse range, azimuth position, and receiver number in which the target was received is registered in control store 5. Receipt of targets by other receivers during the same 4 μs. or range slot are recorded in the same memory slot by registering a 1 for the appropriate receiver number bit. Because the stores are emptied and set to an initial reference condition just prior to the beginning of each new sweep, the first target received becomes the first target written into both the receiver buffer and the control store. When a word has been written into memory its access switch is stepped to the next slot and awaits the next target. Upon receipt of the target, data is written in and the access switch is stepped to the next slot. This action continues with receipt of each successive target. Readout is controlled by the control store. The oldest or shortest range target in the stores is read-out into its output register. The data from each receiver buffer with its receiver number marked in a control store output register is read-out in order of receiver number. The data is read-out of each buffer and is combined with the coarse range, yoke azimuth position and receiver elevation position of the receiver by adder 16 and then passed on to new data store 9.

All of the stores are under control of a 250 kc. clock 15. If a target is received in any 4 μs. interval, it is written into memory. Readout is destructive and is carried on in the same 4 μs. interval. Only one buffer can be readout in each 4 μs. interval. If n receivers have received data during a 4 μs. slot, it takes n times 4 μs. to readout all the buffers associated with this particular range slot. In this manner the rate of data flow to the new data store 9 is confined to a maximum of one target per 4 μs. It is obvious that if more than one receiver receives data during a 4 μs. interval the associated buffers will start to fill up if targets are received in rapid succession. Therefore, storage capacity has been allowed in each buffer to take care of the maximum expected peak target density.

A conversion from asynchronous to synchronous operation is necessary at the front end of the target detector. This follows from the fact that at most any time, after the radar main-bang, target information might be received. The processing circuitry, however, must operate under control of a clock. The conversion is accomplished through the use of two registers 17 and 18 in tandem between the encoder and the receiver buffer stores. See FIGURE 2. The encoded information is shifted into the secondary register 17 upon completion of encoding and into the primary register 18 during a time interval which corresponds to the READ period for the receiver buffer stores. Control logic 20 provides the proper gating pulses. The information is then available for writing into the receiver buffer stores during the following WRITE interval. At this point in the system the asynchronous to synchronous conversion has been completed.

Calculator

The calculator circuits consist of new data store 9, old data store 22, compare circuit 24 and an average circuit 26. The new data and old data stores work together in conjunction with the processing equipment to compare and average the reports of successive radar sweeps. The words passing through the new data store consist of 45 digits. Twelve digits define the target elevation angle. This is the sum of twelve digits from a store defining receiver elevation angle and seven digits from the receiver buffer store. Fourteen digits define the target azimuth. This is the sum of fourteen yoke azimuth digits and seven azimuth interpolation digits. Fifteen digits define target range. The fifteen digits result from combining in order of their significance 11 coarse range digits and four fine range digits. The four remaining digits define the sum signal amplitude.

Words passing through old data store 22 consist of 51 digits. Forty-five of these digits are carried over from the old data store words and the six additional digits are used to keep an account of the word status through processing. These six digits are divided into three pairs. The pairs are used to count the number of matches, coarse data matches, and failures to match. The final disposition of the word is based upon these counts. Reading and writing in the old data store is under control of a calculating circuitry. Whn the processing of a word is completed for each sweep, the word is entered into the input register of old data store 22. Presence of a word in this register is the criteria for writing into the old data store. Similarly, absence of a word in the output register is the criteria for reading from the old data store.

The compare circuit 24 utilizes the fact that target data can be divided into two classes: that which can be resolved by the radar and that which cannot. An example of the latter is data from targets which share a common beam and range slot with one or more other targets. Interpolation information on these signals is unreliable. Therefore, fine comparisons between successive pulses from unresolvable targets cannot be made. However, this is useful information and may be used in the defining of clouds in a decoy environment. However, it is marked with a "coarse" classification and is known as "coarse" data. Data from resolvable targets whose returns compare to within close limits is known as "fine" data. Data is held in the old data store from one sweep to the next for comparison and averaging by circuits 24 and 26. If a fine comparison can be realized, the stored data is averaged with the new data and this average is returned to the old data store to be compared with data from the succeeding sweep. If only a "coarse" comparison can be made, the most recent data is inserted into the old data store for comparison with the data from the next sweep. A history of the returns—or lack of returns—from a target is held with the target data in the old data store. History includes a count of coarse comparisons, a count of fine comparisons, and a count of missed returns (3 max.), initiated after 3 coarse comparisons or 1 fine comparison. Coarse comparison means that data must agree in receiver elevation and range slot. Fine comparison means that data must agree in azimuth to 11 bits, and additionally, in receiver elevation and range slot.

Action on the stored word is taken when the "missed" count reaches 3. If the fine count is 3 or greater, the word is sent downstream as a "fine" word. If the fine count is not satisfied but there is a coarse count of 4 or greater, the word is sent downstream as "coarse" data. If neither the fine count nor the coarse count is satisfied, the word is cast out. Also, if there is no history of comparison, and no comparison with current data, the word is cast out. This is the means by which noise is discarded.

*Operation*

Briefly, the system works as follows. The individual receivers 1 provide data which is gated into the encoders and converted into a binary word thereby. The binary word is shifted in parallel and is stored temporarily in small receiver buffer stores 11 associated with each receiver. Antenna position data and range data common to an antenna yoke is stored in a common control and program store unit 5. As fast as targets are received, there interpolation data are stored in the receiver buffer stores. Concurrently corresponding antenna azimuth position and range are stored in control store 5 with an indication of which receiver or receivers received the data. The control store then controls the orderly flow of data from the receiver buffers to adder 16 which combines the antenna position data with the interpolation data. The data is then passed on to a common processing unit (calculator unit shown in FIGURE 1) in which it is compared for matches with data history of previous sweeps. If a sufficiently good match is obtained, the new data is averaged by averaging circuit 26 with the old and stored or passed on to the track initiator; depending on the target's history.

Two basic classes of data from the receivers made up the words used in data processing within the target detector. The classes of data are distinguishable by the magnitudes of the characteristics which they define. One class of data defines target position within a beam and range slot. This is encoded by the receiver encoders and then stored in the receiver buffer stores. The other class of data defines the antenna yoke azimuth, the receiver elevation angle and the range slot. This is stored in binary form in control store 5. Each word stored in the control store contains data common to all targets which are in the space under the surveillance of a yoke during a single 4 μs. interval (range slot), while each word stored in the receiver buffer stores applies to a specific target in this range slot.

The binary word produced by the receiver encoders consists of 18 digits. Four digits encode the sum signal which is associated with each target return. This makes it possible to identify 16 amplitude levels. Seven digits each are used to encode the azimuth interpolation signal and the elevation interpolation signal. The interpolation signals define the position of the target within a specific antenna beam to a nominal granularity of 0.4 angular mil. The 18 digit words from the encoder are shifted through two registers (17 and 18, FIGURE 2) and subsequently are stored in the receiver buffer store. At the primary register 17 four digits of fine range data are attached to the words by gates 30 and 31 so that the length of the words in the buffer store is 33 digits.

Each word in control store 5 is made up of 85 digits. Sixty of these digits identify which of the 60 receivers on a yoke have received signals during the corresponding four microsecond interval. Each digit among the 60 identifies a single receiver. Each receiver has a fixed relative elevation angle so the single digit among 60 is able to identify the specific elevation angle for a single receiver. The elevation angle for the receiver is read from a permanent memory when the corresponding word is read out of the receiver buffer stores. Twelve digits are required to encode the elevation angle of each receiver to a granularity of 0.4 angular mil, while fourteen digits of the 85 in each word encode yoke azimuth information to a similar granularity of 0.4 angular mil. Eleven digits of the 85 carry the coarse range information. This data has a time granularity of four microseconds and identifies a single range slot.

New data store receives the combined word from the adder 16. The new data store (N.D.S.) and the old data store (O.D.S.) work together in conjunction with the processing equipment to compare and average the reports of successive radar sweeps. This is done in the following way:

Words from previous sweeps are stored in the O.D.S. and words from the present sweep, only, are stored in the N.D.S. until they can be compared with corresponding words from the O.D.S. The sequence of operation is a word from the O.D.S. $X_o$ is entered into compare box 24. The next word from the N.D.S. $X_n$ is compared with this word. If $X_o$ and $X_n$ compare, a "make" is marked in the counter to indicate a match and words $X_o$ and $X_n$ are sent to average circuit 26 to be averaged to form $\overline{X}_o$.

The averaged word $\overline{X}_o$ is then entered into the O.D.S. However, if the comparison fails and the range of $X_n$ is less than the range of $X_o$, it is recognized that $X_n$ is new data as no corresponding word is present in the O.D.S. In this event, $X_n$ is written into the O.D.S. and a new $X_n$ from the N.D.S. is read into the compare box to compare with $X_o$. If the comparison fails and the range of $X_n$ is greater than that of $X_o$, there is no new data which corresponds to $X_o$.

The manner in which $X_o$ will be dealt with is determined by its past history. If the attached "makes" counts for $X_o$ is one or more and its "wilds" count is less than three, $X_o$ is again entered into the O.D.S. after its "wilds" count is increased by one. If the "makes" count is zero for $X_o$, it is then discarded as having been bad data.

Meanwhile $X_n$ remains in the compare box and another $X_o$ from O.D.S. is read-in to be compared with $X_n$. The process is then continued as in the preceding three paragraphs until counts of "makes" and "wilds" show a prescribed number of makes. At this time, the averaged word passes directly from the averaging circuits to the track initiator. This word now defines the position of a target in space at the average time for this "look." Approximately two seconds later, a word should be forthcoming defining the position of the same target for the next "look."

The word passed downstream to the track initiator consists of 45 digits. The division of these digits to represent target azimuth, elevation angle, range, and sum signal amplitude is the same as that for the words flowing into the new data store. A separate word defining time of antenna zero azimuth will also be sent downstream at regular intervals. Time data may be provided to a granularity of one millisecond. To keep a half-hour time count to this granularity, 21 digits are required.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims the invention may be practiced otherwise than as specifically described. Accordingly, it is desired that the scope of the invention be limited only by the appended claims.

We claim:

1. A target detector system comprising at least a target detector unit having a plurality of receiver means therein which can receive target data at a high peak rate; buffer store means connected to outputs of said receiver means so as to temporarily store said target data; common processing means for processing said target data; control means connected to said receiver means and said buffer means so as to cause sequential release of the data at a reduced rate to said common processing means; and said processing means being connected to outputs of said buffer store means and said control means.

2. A target detector system as set forth in claim 1, further comprising a range unit connected to the receiver means so as to receive range marks therefrom; said range unit converting said range marks into range data; and said buffer means and said control means being connected to outputs of said range unit to receive said range data.

3. A target detector system as set forth in claim 2, wherein said common processing means is a calculator means which is so constructed as to compare the data received and determine the presence or absence of a target.

4. A target detector system as set forth in claim 3, further comprising a plurality of detector units disposed in parallel relationship wherein failure of one detector unit will not prevent the detector system from operating, and wherein said plurality of receivers in each detector unit is an antenna yoke.

5. A target detector system as set forth in claim 4, wherein said receiver means each have four output leads which have thereon, respectively, data representing a sum signal, an azimuth interpolation signal, an elevation interpolation signal, and a range mark; said range mark containing data to mark yoke azimuth, target range, and receiver means designation for storage in said control means; and further comprising a means for connecting said sum, azimuth, and elevation signals to the buffer means.

6. A target detector system as set forth in claim 5, wherein said output signals from the receiver means are analog voltages; and said connecting means includes an encoder means connected between the receiver means outputs and the buffer means to convert said output signals into binary words.

7. A target detector system as set forth in claim 6, wherein said data from said encoder means is asynchronous; and further comprising two registers connected in tandem between the encoder means and the buffer store means for conversion of the data from asychronous to synchronous operation.

8. A target detector system as set forth in claim 7, wherein said calculator comprises first and second data store means, a compare circuit and an averaging circuit; said first store means being connected to said buffer means and said control means for receiving target data words therefrom; said compare circuit having first and second inputs and first and second outputs; said first and second data store means having outputs connected respectively to said first and second input of said compare circuit; the first output of said compare circuit being connected to an input of said second data store means; said averaging circuit having an input and a first and second output; said averaging circuit input being connected to said second output of the compare circuit; said first averaging circuit output being the output of the target detector and said second averaging circuit output being connected to said second store means to send an average word which is the average of the words received by the average circuit; said average word containing further data, given thereto by the averaging circuit, to indicate the number of times it has been averaged with another word; and said averaging circuit causing an averaged word to be sent to its first output upon an indication of predetermined number of averagings.

References Cited

UNITED STATES PATENTS

| 3,151,322 | 9/1964 | Hildebrandt | 343—5 |
| 3,214,754 | 10/1965 | Hildebrandt | 343—5 |
| 3,235,867 | 2/1966 | Wirth | 343—5 |
| 3,307,184 | 2/1967 | Poterack et al. | 343—5 |
| 3,315,258 | 4/1967 | Dillard | 343—5 |

RICHARD A. FARLEY, *Primary Examiner.*

C. L. WHITHAM, *Assistant Examiner.*